Figures 1, 2:
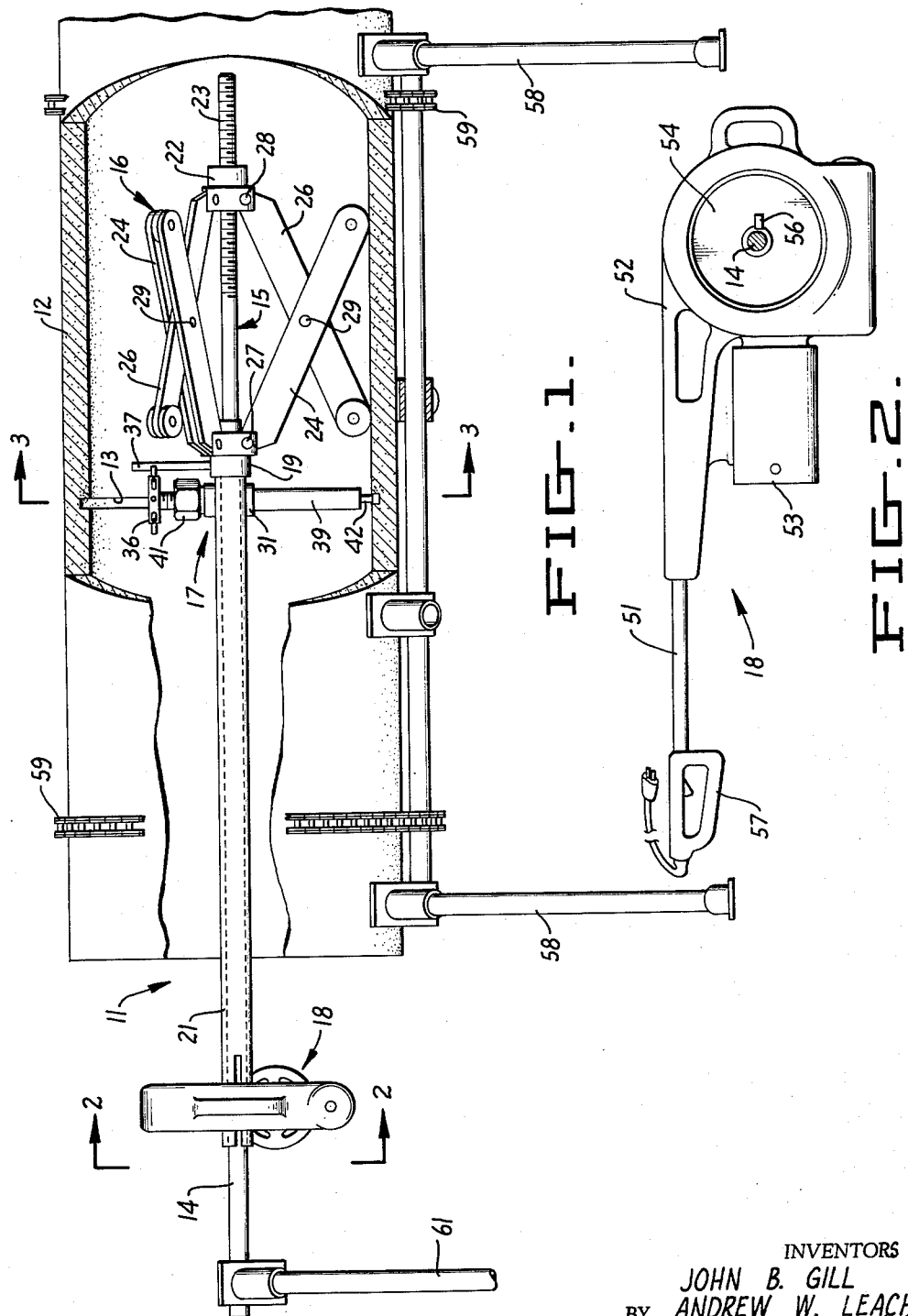

April 5, 1966   J. B. GILL ET AL   3,243,879
MACHINE FOR CUTTING PIPE FROM THE INSIDE THEREOF
Filed July 26, 1963   2 Sheets-Sheet 1

INVENTORS
JOHN B. GILL
BY ANDREW W. LEACH
Schapp & Hatch
ATTORNEYS

April 5, 1966  J. B. GILL ET AL  3,243,879
MACHINE FOR CUTTING PIPE FROM THE INSIDE THEREOF
Filed July 26, 1963  2 Sheets-Sheet 2

INVENTORS
JOHN B. GILL
ANDREW W. LEACH
BY Schapp & Hatch
ATTORNEYS

United States Patent Office 3,243,879
Patented Apr. 5, 1966

3,243,879
MACHINE FOR CUTTING PIPE FROM THE
INSIDE THEREOF
John B. Gill, 20433 Earl St., Torrance, Calif., and Andrew W. Leach, La Mesa, Calif.; said Leach assignor to said Gill
Filed July 26, 1963, Ser. No. 297,913
5 Claims. (Cl. 30—103)

The present invention relates to improvements in a machine for cutting pipe and more particularly to such a machine which carries a pipe cutting tool within the pipe to effect internal cutting thereof in an accurate and efficient manner.

Pipe cutting machines are well-known and various machines have been developed for cutting various types of pipes. However, prior to this invention it has been customary to cut the pipe from the outside with a cutting tool which is advanced radially inwardly into the pipe surface and rotated therearound to provide an ever deepening circular cut until the pipe has been severed. Although eminently satisfactory to achieve cutting, such a system has certain disadvantages such as causing a flange or other such deformation on the inside of the pipe which must be machined away where undesirable.

When the pipe is made of asbestos-cement, such tools cause chipping away as the cutting tool reaches the inner surface of the pipe, and a perfectly smooth end must again be provided by machining the end of the pipe. This problem is particularly acute with certain new types of pipes which contain liners of corrosive resistant materials. For example, asbestos-cement pipes are sometimes provided with epoxy liners and the ordinary cutting operation causes the epoxy to chip or spall away from the surface in the location of the cut.

It has been proposed to cut pipes from the inside, but such cutting operations have been rather difficult because it is necessary to provide considerable forces on the cutting tool and simultaneously to support the tool accurately in position as the cut is made. This means that rigid supporting mechanism which is accurately fabricated, is absolutely essential. Thus, where cutting is to be done at any reasonable distance from the end, and particularly on pipe materials which are large or hard to cut, the internal cutters heretofore suggested, have not been satisfactory.

Accordingly, it is the primary object of the present invention to provide a cutting tool which is capable of cutting the pipe from the inside thereof which is rigidly supported and accurately located within the pipe.

Another object of the invention is to provide a cutting tool of the character described capable of providing a clean, accurate cut which preserves the inside diameter of the internal surface thereof.

A further object of the invention is to provide a cutting tool of the character described which is especially suitable for cutting asbestos-cement pipe including pipes lined with corrosive resistant materials.

A still further object of the invention is to provide a pipe cutting tool of the character described which may be constructed to fit various sizes of pipe and will support itself rigidly within said pipe in proper aligned position.

Still another object is to provide a pipe cutting tool of the character described which is relatively simple in construction and easily transported and used on pipes under field conditions.

These and other objects are obtained by the provision of a pipe cutter for cutting pipe from the inside thereof, comprising a rod member adapted to fit inside the pipe, holding means carried on said rod member adapted to engage the inner surface of the pipe, said holding means containing a plurality of expandable gripping elements actuated by rotation of the rod so as to expand radially into engagement with the inner surface of the pipe and hold the rod in a position substantially the same as the central axis of the pipe, a hollow shaft rotatably mounted on said rod, a cutting tool mounted for rotation with respect to said rod and adapted to fit within the pipe, said cutting tool containing a cutting tool holder mounted on said holder shaft and a cutting blade carried within said cutting tool holder, means for rotating the hollow shaft, and means for moving the cutting blade axially with respect to the cutting tool holder on rotation of said rod to effect internal cutting of the pipe.

Further objects and advantages of our invention will be apparent as the specification progresses, and the new and useful features of our machine for cutting pipe will be fully defined in the claims attached hereto.

Figure 3:
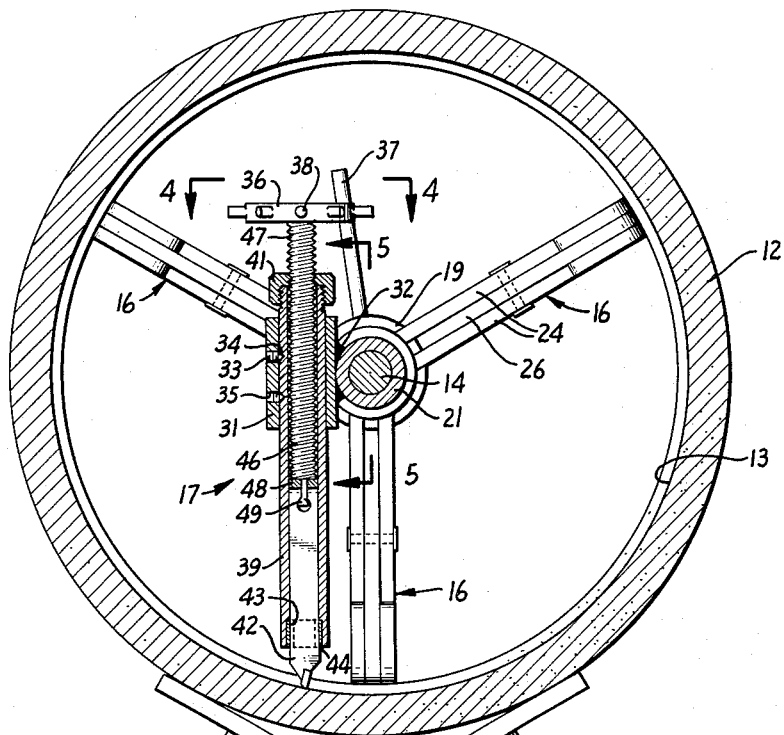
Figures 4, 5:
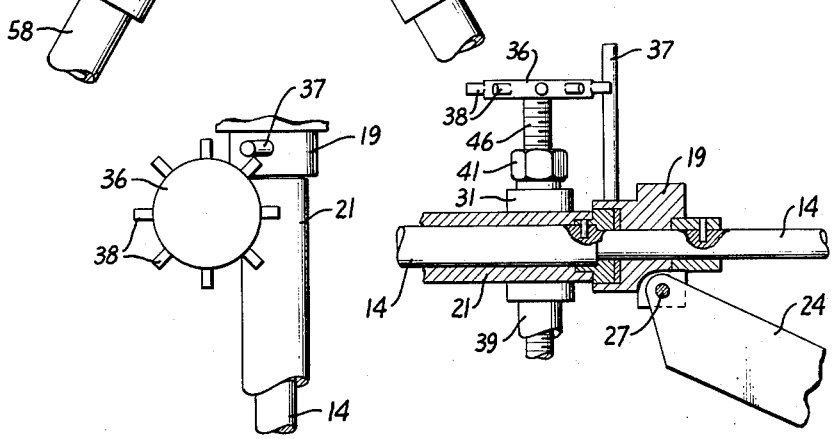

The preferred form of our invention is illustrated in the accompanying drawings, forming a part of this description, in which:

FIGURE 1 shows an elevational view of a pipe cutting tool constructed according to the invention in operative position within a pipe, parts of pipe being broken away to illustrate the cutting tool;

FIGURE 2, a front elevational view of a suitable power unit used for operating the pipe cutting tool of the invention in the preferred form thereof;

FIGURE 3, a cross-sectional view illustrating parts of the pipe cutting apparatus of FIGURE 1 as seen in the plane of line 3—3 thereof;

FIGURE 4, an enlarged view of certain parts of the pipe cutting apparatus illustrated in FIGURES 1 through 3 as seen from the line 4—4 of FIGURE 3 and showing the operation of the means for advancing the cutting tool; and FIGURE 5, a sectional view taken substantially in the plane of line 5—5 of FIGURE 3.

While we have shown only the preferred forms of our invention, it should be understood that various changes or modifications may be made within the scope of the claims attached hereto without departing from the spirit of the invention.

Referring to the drawing in greater detail, there is shown in FIGURE 1, a pipe cutter 11 suitable for cutting a pipe from the inside thereof held in operative position within an asbestos-cement pipe 12 so as to effect a cut 13 on the inner periphery thereof. In its broad aspect, the pipe cutter 11 comprises an arbor 15 containing an elongated rod member 14 adapted to fit inside the pipe 12 and extend outward from one end thereof, holding means 16 carried on said arbor 15 for holding the arbor in a centered position substantially the same as the central axis of the pipe, a cutting tool 17 mounted on said rod for rotation with respect thereto, and means 18 for rotating the cutting tool with respect to the holding means 16 and the pipe 12.

As illustrated in FIGURE 1, the holding means 16 is adapted to engage the inner surface of the pipe and is preferably constructed with expandable units so as to accommodate various different sizes of pipes. The unit is also capable of being tightened firmly in place by rotation of rod 14 through the portion thereof extending externally from the pipe so as to provide easy application of the cutting tool.

In general, the holding means 16 may be any unit having the abovementioned properties, and a typical example of such a unit is described in the United States Patent 2,607,376 to John T. Montgomery entitled Pipe Machining Tool patented August 19, 1952. Another suitable gripping means that may be used is described and claimed in the co-pending application of John B. Gill, a coinventor in this application, entitled Arbor Construction for Pipe Tools, filed November 19, 1963 under Serial No. 324,765.

In the form here shown, the holding means 16 comprises a bearing 19 through which rod 14 may revolve but which is held against endwise movement by a shoulder 20 (see FIGURE 5) on rod 14 as its diameter is reduced. Holding means 16 also includes a nut 22 threaded upon the inner end of shaft 14 in cooperative relation with threads 23 thereof, and cooperative fingers 24 and 26 pivoted to the bearing 19 and nut 22 at 27 and 28 and to each other intermediate their length as at 29.

Preferably, the three radial sets of fingers provide expandable grips spaced 120° apart, with the grips all being symmetrically constructed so that rod 14 is maintained in exact central alignment with the three contacting points so as to center the rod in exact position within cylindrical pipes.

In order to set the gripping assembly in place, one of the three sets of fingers is adjusted vertically downward and the fingers expanded so as to almost grip the entire internal surface of the pipe. The unit is then slipped axially into the pipe using the lowermost set of fingers for support unitl the holding means 16 has been properly positioned. Then the device is held in position so as to provide the proper location of the cutting tool and the rod 14 is rotated so as to move nut 22 inwardly toward bearing 19 and expand the fingers. Once the fingers are expanded and a tight grip is obtained, extremely good anchoring for the tool is provided.

In order to transfer power from a position outside the pipe to the cutting tool within, a hollow drive shaft 21 is provided, and this shaft is rotatably mounted on rod 14 by any suitable bearing means (not shown). The cutting tool 17 is mounted in any conventional manner on the hollow shaft 21 so that the cutting tool will rotate as shaft 21 is rotated. A typical mounting is illustrated in FIGURE 3 in which a holder 31 is welded to the shaft 21 at 32. The cutting tool 17 is then held in telescopic relation within holder 31 by means of set screw 33 fitting into dimple 34 of holder 31. A second adjustment of the cutting tool 17 is provided by threaded hole 35 which is spaced one inch from the hole containing set screw 33 and provides a setting for a pipe diameter two inches less than the one shown.

In general, the cutting tool 17 may be any suitable mechanism capable of advancing a cutting blade into the pipe to provide the desired cut. A typical cutting tool is illustrated in the drawing which is constructed in similar fashion to the cutting tool shown in the United States Patent 2,761,212 of John B. Gill, a coinventor of the present application, except that the means for rotating the cutting tool comprises a star wheel 36 which is operated by striker 37 instead of the hand operation illustrated in the patent. As here shown, the striker 37 is mounted on the bearing 19 of holding means 16 and thereby remains substantially stationary during operation. However, the cutting tool 17 rotates along with shaft 21 so that on each rotation of the cutting tool, the star wheel is advanced as one of the cog elements 38 engages the striker. This causes advancement of the cutting blade in the same manner as described in the patent cited above.

Briefly speaking, the cutting tool 17 comprises a tube 39 having an end threaded into the cap 41, a cutter blade 42 slidable axially within the tube 39 but held against rotation by slots 43 of bushing 44, a feed screw 46 threaded into the cap 41 with complementary threads 47, and a thrust collar 48. The operation and exact construction of the parts such as the thrust collar is more fully illustrated in the United States patent cited above. However, it is seen that advancement of the cutter blade 42 is provided by rotation of feed screw 46 in cap 41 and that the thrust force is transmitted from the feed screw to the thrust collar 48. Thrust collar 48 does not rotate but contains a slot (not shown) which fits onto the end of the cutter blade 42. Thus relative rotation occurs between the feed screw and the thrust collar which serves as a bearing surface and provides the necessary axial movement together with the required force for moving the cutter blade into the pipe and providing sufficient force for it to bite therein as the cut is made. Retraction of the cutter blade on reverse movement of the feed screw is accomplished by the ball 49 projecting from the end of feed screw 46 and fitting into a complementary socket on the cutter blade.

As mentioned above, power is provided to the cutter through rotation of hollow shaft 21, and this power is provided through the means 18 for rotating the shaft and the cutting tool. In general, any suitable power means may be utilized to provide this rotational movement, but we prefer to use one of the portable power units provided by Pilot Manufacturing Co. of 20433 Earl St., Torrance, California. These power drives include the electric power drive solid under Code # P68A which is the same as the illustrated in the drawing, or the pneumatic power drive sold under the code name P68AR. Obviously other power units could be used such as a belt drive or other system from a power takeoff on any field unit or a hydraulic motor operating from a suitable power source.

The electric power drive herein shown comprises a lever arm 51 attached to a frame 52 which carries an electric motor 53 and a rotor 54 driven through suitable gears (not shown). The rotor 54 contains means 56 for fastening the rotor to the hollow shaft 21. In operation, the drive unit is simply telescoped over the shaft and the fastening means tightened in place. As shown in the Pilot literature, the opening in this drive rotor is adjustable so that easy application on drive shafts of various sizes may be effected. The lever arm 51 is important to provide means whereby the operator can hold the unit or fasten it to a horse to buck the torque and handle 57 is provided to facilitate operation.

In operation, the pipe is generally held by chain tongs on a horse as shown in FIGURE 1 in order to provide sufficient holding forces to oppose the cutting torque of the tool and to prevent undue strains after the pipe is cut. As here shown, the pipe 12 is supported on a typical horse 58 which is of conventional structure and generally utilized for this purpose. Chains 59 are then wrapped around the pipe and a member of the horse and tightened in place in order to provide a rigid support for the pipe and oppose any rotational forces in the pipe.

With the pipe thus set in place, the pipe cutter is brought close to the end of the pipe, and the holding means 16 on the arbor are oriented in the shape of a Y with one of the groups of fingers extending vertically downward. The arbor is set with the end thereof, just inside the pipe and the gripping means are expanded by hand rotation until just about ready to grip the pipe. The cutter blade is also advanced by hand rotation of the star wheel until the cutter blade is about to engage the inner pipe surface.

The entire unit is then slid axially into the pipe and the cutter blade is positioned by measuring the distance of the cutter blade from the end of the pipe by means of a carpenter's rule or any other suitable measuring device. With the unit thus set in place, arbor 15 is rotated with a suitable wrench until the expandable gripping means have been expanded tightly against the pipe to provide a strong clamping engagement therein.

With the pipe cutter thus set in place, the power unit 18 is applied to shaft 21 as indicated above. Another horse 61 or equivalent holding means is provided to hold the end of shaft 14 in central alignment so as to prevent twisting of the arbor. This prevents binding of the hollow shaft 21 and helps to assure proper driving thereof.

With the pipe cutter thus set in place, the power unit 18 is turned on and shaft 21 rotated under power until the pipe has been cut off. This cutting is effected because rotation of hollow shaft 21 causes corresponding rotation of the cutting tool 17 which is carried on this shaft. Each time the cutting tool is rotated, the star wheel engages the striker bar and this causes radial movement of the cutter blade so that it bites deeper into the pipe and provides a progressively deeper cut. In this way, the cutter blade is advanced incrementally for each revolution of the cutting tool.

After the pipe has been severed, the power unit is shut off and the cutter blade is retracted by hand rotation of the star wheel in a reverse direction. Arbor 14 is then rotated in the reverse direction by a suitable wrench to retract the expandable gripping means in an amount sufficient to withdraw the pipe cutter from the pipe. The pipe is then removed from the horse and ready for use, the cut being clean and providing no internal flange.

From the foregoing description, it is seen that we have provided an improved pipe cutter capable of cutting large asbestos-cement pipes from the inside thereof in a rapid and efficient manner. It is also seen that the pipe cutter of this invention is capable of retaining exact central alignment while also providing support for the necessary forces to achieve a clean cut in a rapid manner. In addition, it is seen that we have provided an apparatus of this character which is effective in operation, sturdy in construction, and capable of many years of service under rugged field conditions.

We claim:

1. A pipe cutter for cutting a pipe from the inside thereof, comprising a rod member adapted to fit inside the pipe, holding means carried on said rod member adapted to engage the inner surface of the pipe, said holding means containing a plurality of expandable gripping elements actuated by rotation of the rod so as to expand radially into engagement with the inner surface of the pipe and hold the rod in a position substantially the same as the central axis of the pipe, a cutting tool mounted for rotation with respect to said rod and adapted to fit within the pipe, and said cutting tool containing a tubular cutting blade holder mounted substantially radially of the pipe when the pipe cutter is positioned within said pipe and a cutting blade mounted for axial movement within said cutting tool holder, means for rotating the cutting tool with respect to said holding means and the pipe, a striker carried on said holding means and a star wheel carried on said cutting tool in position to operatively engage the striker for advancing the cutting blade on rotation of the cutting tool.

2. A pipe cutter for cutting a pipe from the inside thereof, comprising an elongated rod member adapted to fit inside the pipe, holding means carried on said rod member at one end thereof adapted to engage the inner surface of the pipe, said holding means containing a plurality of expandable gripping elements actuated by rotation of the rod so as to expand radially into engagement with the inner surface of the pipe and hold the rod in a position substantially the same as the central axis of the pipe, said gripping elements formed for movement in an expandable fashion without influence on axial displacement of said rod, a hollow shaft rotatably mounted on said rod between the holding means and the pipe end, a cutting tool holder mounted on said hollow shaft at the end thereof near said holding means, a cutting blade carried within said cutting tool holder, a feed screw carried within said cutting tool holder and operatively connected to the cutting blade whereby axial movement of the feed screw will cause axial movement of the cutter blade, a driven element on the feed screw for rotating the screw within the cutting tool holder and causing axial movement thereof, a drive element on said holding means for driving said driven element, and means for rotating the hollow shaft.

3. The pipe cutter defined in claim 2, in which the drive element is a striker bar and the driven element is a star wheel.

4. The pipe cutter defined in claim 2, in which a thrust collar is provided between the feed screw and the cutting blade.

5. A pipe cutter for cutting pipe from the inside thereof, comprising an elongated rod member adapted to fit axially inside the pipe and extend beyond one end thereof, a bearing member rotatably mounted on said shaft and held against endwise motion with respect thereto, a nut member threaded on one end of the shaft, radial sets of cooperative fingers pivoted in the bearing member and the nut member, respectively, and pivots connecting the fingers of each set intermediate their length whereby the free ends of the fingers are made to move toward or away from the rod member in response to a turning movement of the rod member and its bearing member, a hollow shaft rotatably mounted on said rod, a cutting tool mounted for rotation with respect to said rod and formed to fit within the pipe, said cutting tool containing a cutting tool holder mounted on said hollow shaft and a cutting blade carried for axial movement within said cutting tool holder, means for rotating the hollow shaft from a position externally of the pipe, a striker carried on said bearing member, and a star wheel carried on said cutting tool holder in position to operatively engage the striker for advancing the cutting blade on rotation of the cutting tool.

References Cited by the Examiner

UNITED STATES PATENTS

| | | | |
|---|---|---|---|
| 872,290 | 11/1907 | Lusk | 30—105 |
| 910,547 | 1/1909 | Kohler | 30—107 |
| 936,263 | 10/1909 | Young | 30—106 |
| 1,007,330 | 10/1911 | Browder | 30—104 |
| 2,117,050 | 5/1938 | Wilson | 166—55.7 |
| 2,638,667 | 5/1953 | Anderson | 30—107 |
| 2,761,212 | 9/1956 | Gill | 30—100 |
| 2,915,819 | 12/1959 | O'Day | 30—103 |

WILLIAM FELDMAN, *Primary Examiner.*

MYRON C. KRUSE, *Examiner.*